United States Patent
Cech et al.

(10) Patent No.: US 9,520,061 B2
(45) Date of Patent: Dec. 13, 2016

(54) VEHICLE DRIVER MESSAGING SYSTEM AND METHOD

(75) Inventors: Leonard Cech, Brighton, MI (US); Stephen Vachon, White Lake, MI (US)

(73) Assignee: TK Holdings Inc., Auburn Hills, MI (US)

( * ) Notice: Subject to any disclaimer, the term of this patent is extended or adjusted under 35 U.S.C. 154(b) by 2464 days.

(21) Appl. No.: 12/213,591

(22) Filed: Jun. 20, 2008

(65) Prior Publication Data

US 2009/0319095 A1    Dec. 24, 2009

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63H 25/04* | (2006.01) |
| *G05D 1/00* | (2006.01) |
| *G08G 1/0962* | (2006.01) |
| *B60K 35/00* | (2006.01) |
| *B62D 15/02* | (2006.01) |
| *G08G 1/16* | (2006.01) |

(52) U.S. Cl.
CPC ............ *G08G 1/0962* (2013.01); *B60K 35/00* (2013.01); *B62D 15/029* (2013.01); *G08G 1/16* (2013.01); *B60K 2350/2052* (2013.01); *B60K 2350/928* (2013.01); *G08G 1/168* (2013.01); *Y02T 10/84* (2013.01)

(58) Field of Classification Search
USPC .................. 340/691.6, 461, 438, 691.1, 439, 441,340/449, 450; 345/349; 463/39; 701/1, 36, 41, 701/400, 516, 523
See application file for complete search history.

(56) References Cited

U.S. PATENT DOCUMENTS

| | | | |
|---|---|---|---|
| 4,850,015 | A | 7/1989 | Martin |
| 5,566,072 | A | 10/1996 | Momose et al. |
| 5,666,102 | A | 9/1997 | Lahiff |
| 5,758,311 | A | 5/1998 | Tsuji et al. |
| 5,821,935 | A * | 10/1998 | Hartman et al. ............. 715/839 |
| 5,850,458 | A | 12/1998 | Tomisawa et al. |
| 6,219,645 | B1 | 4/2001 | Byers |

(Continued)

FOREIGN PATENT DOCUMENTS

| | | |
|---|---|---|
| CN | 1771158 A | 5/2006 |
| CN | 101107145 A | 1/2008 |

(Continued)

OTHER PUBLICATIONS

International Search Report and Written Opinion mailed May 13, 2010, received in International application No. PCT/US2009/063822.

(Continued)

*Primary Examiner* — Ronnie Mancho
(74) *Attorney, Agent, or Firm* — Gordon & Rees LLP

(57) ABSTRACT

A steering wheel system for a vehicle includes a display and a controller. The controller receives vehicle parameters from one or more vehicle sensors as well as geometric or navigability characteristics of the road. The controller generates a prediction of an effect of the vehicle parameters on the vehicle with respect to the geometric or navigability characteristics of the road. The controller sends a signal to the display based on the prediction. The display is configured to display a representation of the prediction based on the signal received from the controller.

22 Claims, 5 Drawing Sheets

(56) References Cited

U.S. PATENT DOCUMENTS

| | | | |
|---|---|---|---|
| 6,339,758 | B1 | 1/2002 | Kanazawa et al. |
| 6,782,240 | B1 | 8/2004 | Tabe |
| 7,415,520 | B2 | 8/2008 | Hierholzer et al. |
| 7,605,694 | B2 | 10/2009 | Prost-Fin et al. |
| 7,775,884 | B1 * | 8/2010 | McCauley ............... 463/39 |
| 7,786,886 | B2 * | 8/2010 | Maruyama et al. ....... 340/691.6 |
| 2001/0011200 | A1 | 8/2001 | Kobayashi et al. |
| 2002/0068605 | A1 | 6/2002 | Stanley |
| 2002/0135163 | A1 | 9/2002 | Derrick |
| 2003/0064748 | A1 | 4/2003 | Stulberger |
| 2003/0182810 | A1 | 10/2003 | Sano |
| 2004/0030458 | A1 | 2/2004 | Entenmann |
| 2004/0122562 | A1 | 6/2004 | Geisler et al. |
| 2004/0138882 | A1 | 7/2004 | Miyazawa |
| 2004/0240679 | A1 | 12/2004 | Kennedy et al. |
| 2005/0152563 | A1 | 7/2005 | Amada et al. |
| 2005/0189159 | A1 | 9/2005 | Weber et al. |
| 2006/0070795 | A1 | 4/2006 | Meissner |
| 2006/0115103 | A1 | 6/2006 | Feng et al. |
| 2006/0188107 | A1 | 8/2006 | Inoue et al. |
| 2006/0204026 | A1 | 9/2006 | Kargus |
| 2006/0285697 | A1 | 12/2006 | Nishikawa et al. |
| 2006/0286944 | A1 | 12/2006 | Songwe, Jr. |
| 2007/0039775 | A1 | 2/2007 | Matsuno et al. |
| 2007/0089661 | A1 | 4/2007 | Yazaki et al. |
| 2007/0127736 | A1 | 6/2007 | Christoph |
| 2007/0238491 | A1 | 10/2007 | He |
| 2007/0257889 | A1 | 11/2007 | Croy |
| 2008/0023253 | A1 | 1/2008 | Prost-Fin et al. |
| 2008/0059026 | A1 | 3/2008 | Akiyama |
| 2008/0061954 | A1 | 3/2008 | Kulas |
| 2008/0143505 | A1 | 6/2008 | Maruyama et al. |
| 2009/0192795 | A1 | 7/2009 | Cech |
| 2010/0295670 | A1 * | 11/2010 | Sato et al. ............... 340/458 |

FOREIGN PATENT DOCUMENTS

| | | |
|---|---|---|
| DE | 100 13 432 C1 | 9/2001 |
| DE | 10 2004 042 331 A1 | 12/2005 |
| JP | 2001-253219 A | 9/2001 |
| JP | 2002-154397 | 5/2002 |
| JP | 2003-066986 | 3/2003 |
| JP | 2003-195890 A | 7/2003 |
| JP | 2003-276526 | 10/2003 |
| JP | 2003-300468 | 10/2003 |
| JP | 2004-053492 | 2/2004 |
| JP | 2004-132897 | 4/2004 |
| JP | 2004-132897 A | 4/2004 |
| JP | 2004-149120 | 5/2004 |
| JP | 2004-153660 | 5/2004 |
| JP | 2004-206063 | 7/2004 |
| JP | 2004-287728 | 10/2004 |
| JP | 2004-338442 A | 12/2004 |
| JP | 2005-195955 | 7/2005 |
| JP | 2005231622 | 9/2005 |
| JP | 2006-047198 | 2/2006 |
| JP | 2006151192 | 6/2006 |
| JP | 2006-521954 | 9/2006 |
| JP | 2006264615 | 10/2006 |
| JP | 2010-539586 | 12/2010 |
| KP | 2000 0017980 A | 4/2000 |
| KR | 10-2000-001/980 A | 4/2000 |
| KR | 2000-0017980 | 4/2000 |
| KR | 2002-088912 A | 11/2002 |
| KR | 10-2005-0089253 A | 9/2005 |
| KR | 2006-0026157 | 3/2006 |
| WO | WO-2006/076903 A1 | 7/2006 |
| WO | WO-2006/076904 A1 | 7/2006 |
| WO | WO-2007/021263 A1 | 2/2007 |
| WO | WO-2009/038502 | 3/2009 |

OTHER PUBLICATIONS

International Search Report issued by Korean Intellectual Property Office dated Jun. 16, 2009 for International Application No. PCT/US2008/083404.

International Search Report dated Sep. 29, 2009 for International Application No. PCT/US2009/048015.

International Search Report and Written Opinion; PCT/US2008/083393; Apr. 14, 2009; 10 pages.

Office Action in U.S. Appl. No. 12/292,149 dated Sep. 8, 2011; 9 pages.

Office Action in U.S. Appl. No. 12/292,150 dated Aug. 8, 2011; 12 pages.

Office Action in U.S. Appl. No. 12/292,149 dated Apr. 14, 2011; 7 pages.

Communication (Supp EP Search Report) in EP Appln No. 09767859.3 dated Mar. 29, 2012.

Office Action in U.S. Appl. No. 12/292,149 dated Apr. 9, 2012.

Communication (Supplementary EP Search Report) in EP Appln No. 08849392.9 dated Nov. 3, 2011.

Communication (Supplementary EP Search Report) in EP Appln No: 08849994.2 dated Oct. 27, 2011.

First Office Action of China State Intellectual Property Office Application No. 200980123048.9 dated Oct. 9, 2012.

Office Action dated Jan. 14, 2014 issued in connection with Japanese Patent Application No. 2010-534178, with English Translation.

Office Action Japanese Patent Application No. 2010-534175 dated Feb. 12, 2013.

Office Action dated Apr. 8, 2015 issued in U.S. Appl. No. 12/292,149.

Office Action Japanese Patent Application No. 2010-534178 dated May 21, 2013.

Decision of Rejection dated Jul. 22, 2014 issued in connection with Japanese Application No. 2010-534178 with English translation.

Office action dated Jun. 12, 2014 issued in connection with U.S. Appl. No. 12/292,149.

Non-final Office Action dated Nov. 1, 2013 issued in connection with U.S. Appl. No. 12/292,149.

Notification of Reasons for Refusal dated Sep. 18, 2013 issued in connection with Japanese Application No. 2011-514858.

* cited by examiner

VEHICLE DRIVER MESSAGING SYSTEM AND METHOD

BACKGROUND

The present application relates generally to a system and method for providing a message to a vehicle driver. More specifically, the application relates to a system and method for providing a warning or instructive message to a vehicle driver.

Conventional vehicle navigation systems employ various displays to inform the driver of the next navigation event (e.g., maneuver or turn) and the distance to the event. The event is typically represented as a simple icon representing the geometric characteristics of the next steering maneuver for example left turn, right turn, merge, etc. Conventionally, there are only a finite number of icons to represent each real world maneuver scenario. Driver navigation based on simple icon information is often termed "Turn-by-Turn" navigation. Turn-by-turn icons are conventionally presented in a small display on the driver instrument panel (IP) or in the steering wheel rim. The icons are typically only updated when a driver completes a required turn or when a new maneuver event is within a designated range.

The quality, reliability, and prevalence of vehicle navigation systems as well as map resolution and road attributes continue to rapidly improve. The National Highway Traffic Safety Administration (NHTSA) has initiated a new regulation mandating the use of electronic stability control (ESC) systems on all U.S. vehicles by the year 2013. Conventional ESC systems use a steering angle sensor to track the real-time status of the driver steering input. Vehicle inertial and wheel speed sensors can provide real-time information about vehicle dynamics. Predictive sensors such as radar, Light Detection and Ranging (LIDAR), and vision sensors can provide anticipatory information of what is in the vehicle path. Map and GPS based navigation systems can provide information on the current and pending road geometry, features and attributes. Intelligent transportation systems such as vehicle to vehicle and vehicle to infrastructure communications can provide additional information on the road and traffic situation. Each of these sensors and sources of data can provide a wide range of information that may be useful in enhancing safety or driver assistance.

A steering wheel can be configured to present driver warning, assistance, and diagnostic information to the driver within his or her peripheral vision when looking at the approaching road. The steering wheel may update icons at a rate exceeding the human vision perception rate so that the shape, size, color, intensity, and contrast of the icon is perceived to change seamlessly to not distract the driver.

Vehicle systems continue to evolve towards increasing autonomy. For example, brake-by-wire and throttle-by-wire technologies provide some level of vehicle autonomy. In addition, semi-active steering assistance systems can improve driver handling based on vehicle speed. However, such systems must be deployed carefully when first introduced to consider all failure modes and in a way that allows the driver to gradually become comfortable with the new features but also be able to override the vehicle autonomy. For example, throttle settings for an autonomous cruise control (ACC) system or braking settings for automated braking scenarios should default back to manual control when a driver presses on the brake pedal. In a similar fashion, a driver can pre-empt autonomous braking or throttle by requesting braking or throttle levels higher than the autonomous levels through use of the accelerator or brake pedals.

In some production vehicles, fully autonomous pre-crash braking is conventionally deployed. In the majority of production vehicles, autonomous throttle is realized through cruise control, ACC, and automated stop and go systems. However, driver steering remains a vehicle dynamics input that has not been made fully autonomous during typical driving situations. As autonomous steering is developed, a method to build driver confidence in such a system is needed.

The difference between success and failure in race driving is often determined in fractions of a second where very small steering, braking or throttle errors can lead to lost time. The driver should try to travel the shortest distance (line) at the highest average rate of speed. While the driver can repeatedly practice a course to improve lap times, he/she conventionally has no immediate feedback of appropriate speed and driving lines as he drives the course.

There is a need for a system and method for improved guidance on unfamiliar roads or in poor external environments such as snow, sleet, rain, and darkness. There is also a need for a real-time system and method for providing safety feedback to a driver. There is also a need for a system and method for providing driver training in an evolutionary step towards autonomous steering or vehicle driving. Further, there is a need for a real-time feedback system and method for driver training. Further still, there is a need for a system and method that uses existing vehicle sensors and systems to improve driver road awareness. There is also a need for a system and method capable of providing training on how to race a vehicle.

SUMMARY

One embodiment of the application relates to a steering wheel system for a vehicle. The steering wheel system includes a display and a controller. The controller is configured to receive vehicle parameters from one or more vehicle sensors and receive geometric or navigability characteristics of the road. The controller generates a prediction of an effect of the vehicle parameters on the vehicle with respect to the geometric or navigability characteristics of the road. The controller is configured to send a signal to the display based on the prediction. The display is configured to display a representation of the prediction based on the signal received from the controller.

Another embodiment of the application relates to a vehicle system. The vehicle system includes a steering wheel usable by a driver for steering a vehicle, a display, and a controller. The controller is configured to receive vehicle parameters from one or more vehicle sensors and receive geometric or navigability characteristics of the road. The controller generates a prediction of an effect of the vehicle parameters on the vehicle with respect to the geometric or navigability characteristics of the road. The controller is configured to send a signal to the display based on the prediction. The display is configured to display a representation of the prediction based on the signal received from the controller.

Another embodiment of the application relates to a method for providing driver guidance. The method includes receiving geometric or navigability characteristics of a road, receiving data from one or more vehicle sensors, generating a prediction of an effect of the vehicle parameters on the vehicle with respect to the geometric or navigability characteristics of the road, and displaying a message for the driver based on the prediction.

BRIEF DESCRIPTION OF THE DRAWINGS

Several embodiments of the present application will be described below with reference to the accompanying drawings, in which.

DETAILED DESCRIPTION OF THE EXEMPLARY EMBODIMENTS

Figure 1:
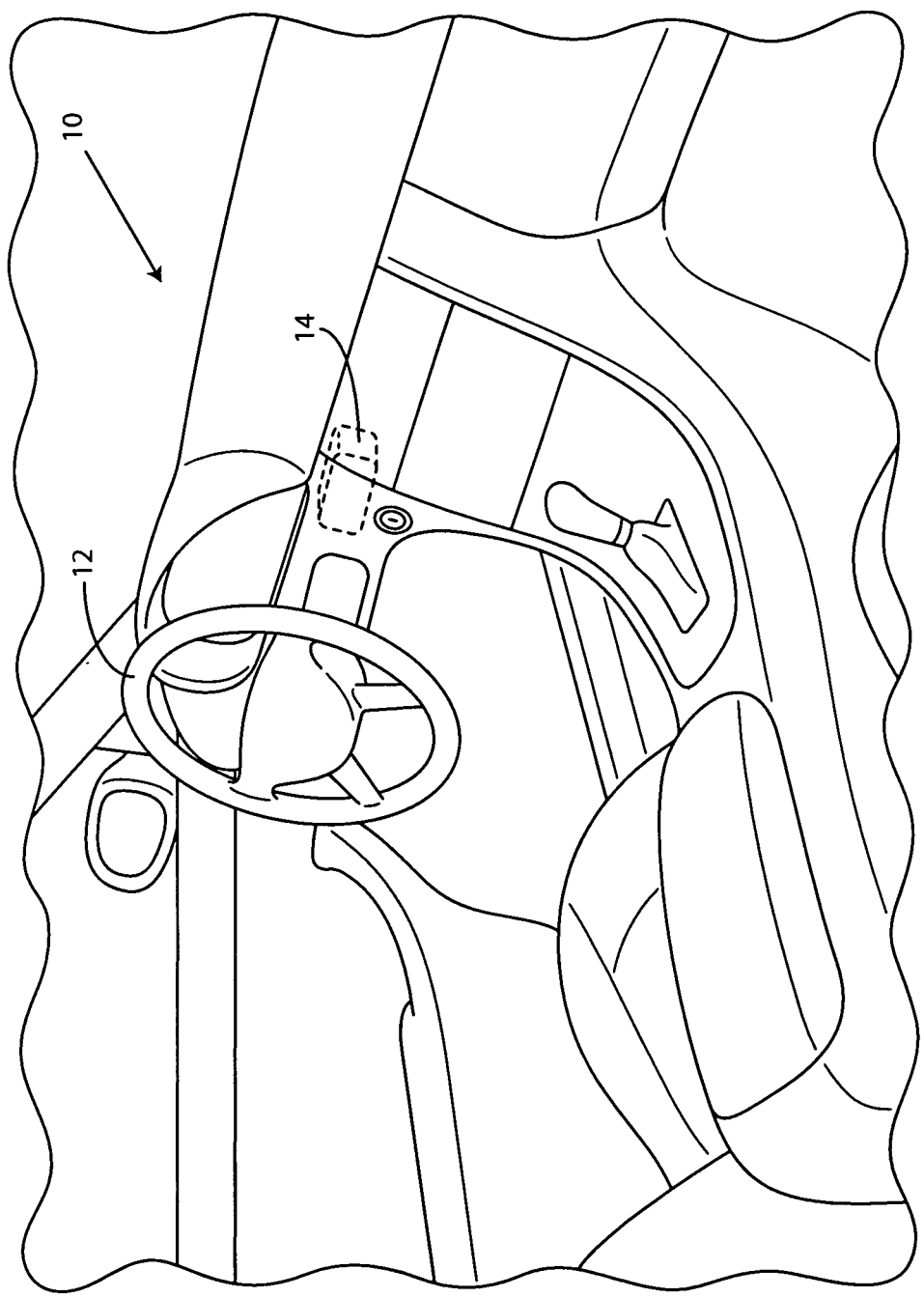
FIG. 1 is a perspective view of a vehicle cockpit, according to an exemplary embodiment.

Referring to FIG. 1, a vehicle driver may operate a vehicle from a cockpit 10. The cockpit 10 includes a steering wheel 12 and a controller 14. The driver may rotate the steering wheel to turn the vehicle wheels and steer the vehicle in a desired direction. The steering wheel may also be configured to provide a message (e.g., a visual message, an audible message, etc.) to the driver related to a current vehicle state, the road geometry or conditions, a predicted vehicle state, or any combination thereof. The message may be generated by a controller 14 based on data related to the vehicle and road. The message can be a warning message of excessive or insufficient speed, acceleration, or braking or understeer or oversteer. The message may also include instructions on actions to take, for example how to negotiate or maneuver a corner, obstacle, or road condition. According to various exemplary embodiments, the steering wheel 12 may be any steering wheel usable by a driver to steer the vehicle and capable of providing a message to the driver. According to various exemplary embodiments, the controller 14 may be an analog controller, a digital controller, a software controller, or any combination thereof.

Figure 2:
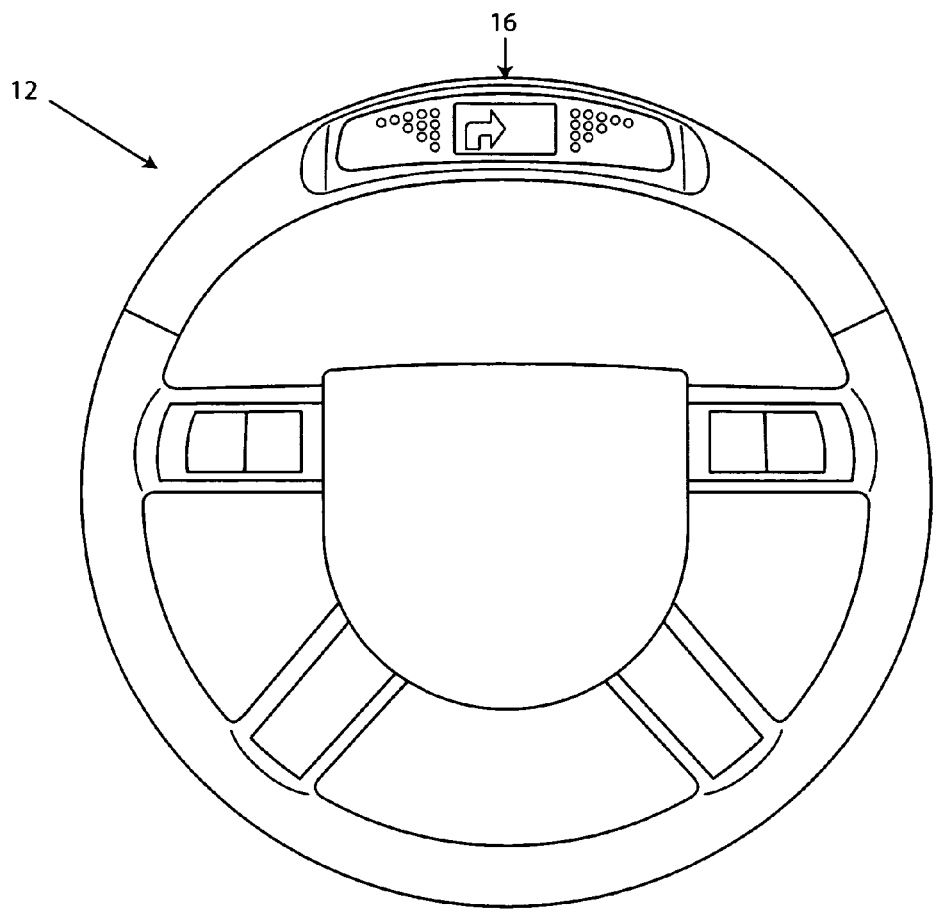
FIG. 2 is a schematic view of a steering wheel including a display, according to an exemplary embodiment.
Figure 3:
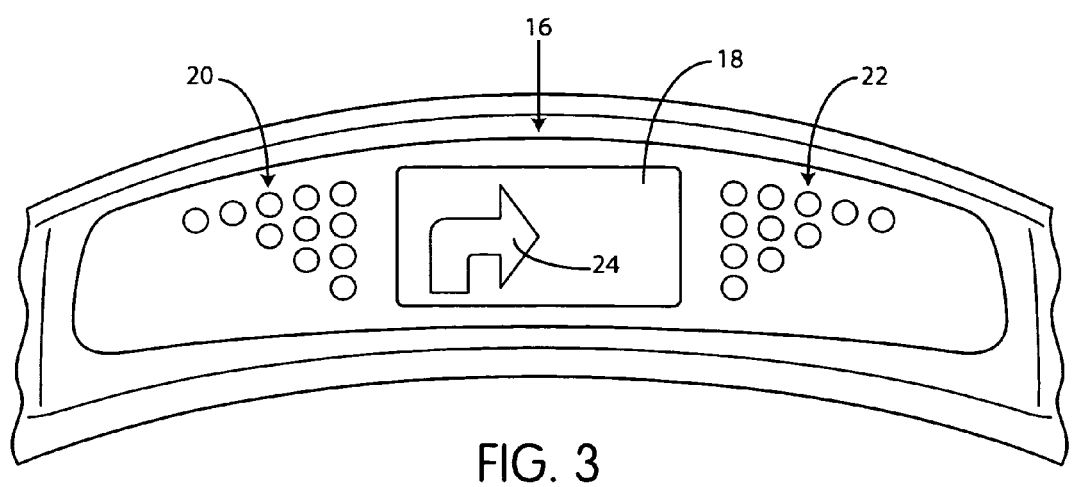
FIG. 3 is a more detailed schematic view of the display of FIG. 2, according to an exemplary embodiment.

Referring to FIGS. 2-3, the steering wheel 12 may include a display 16, for providing messages to the driver, according to some exemplary embodiments. The display generally includes display portions 18, 20, and 22.

The display portion 18 is configured to display or illuminate an icon 24 to indicate a direction that a driver should maneuver or steer the vehicle. The icon 24 may have a fixed shape and size or a variable shape and size that indicates the angle of a turn. A variably shaped icon may change shapes as the vehicle approaches or proceeds through the maneuver. The icon 24 may be of a single color, a user-configurable color, or multiple colors that vary based on the degree of the or severity of the maneuver. For example, a green icon may indicate that the maneuver may be achieved at a current speed, a yellow icon may indicate that the maneuver may be unsafe at the current vehicle speed, and a red icon may indicate that the maneuver is unsafe at the current speed. The icon 24 may be of a fixed intensity, a user-configurable intensity, or an intensity that varies with the degree or severity of the maneuver. For example, a less intense icon may indicate that the maneuver may be achieved at a current speed while a more intense icon may indicate that the speed should be reduced.

While the display portion 18 is shown to include a single icon, according to other exemplary embodiments, multiple icons may be displayed. The display portion 18 may additionally or instead be configured to warn the driver of excessive speed, excessive acceleration, excessive braking, insufficient braking, insufficient braking, understeer, or oversteer for an approaching geometry of the road. The display portion 18 may include multiple LEDs (organic or inorganic), an LCD display, a TFT display, an incandescent bulb, a plasma display, and/or a CRT display.

The display portions 20 and 22 may be configured to supplement the display portion 18 by giving further indication of excessive speed, excessive acceleration, excessive braking, insufficient braking, insufficient braking, understeer, or oversteer for an approaching geometry of the road. The display portions 20 and 22 may include one or more LEDs (organic or inorganic), one or more incandescent lamps, an LCD display, a TFT display, a plasma display, and/or a CRT display. Similar to the display portion 18, the display portions 20 and 22 may indicate the degree or severity of a maneuver by changing intensity, color, shape, and/or size. For example, if the display portions 20 and 22 include multiple LEDs, a changing severity or degree of a maneuver may be indicated by illuminating more or fewer LEDs, by changing colors from green to red or red to green, or by increasing or decreasing in intensity.

The display portions 20 and 22 may operate similar to one another, for example as mirror opposites, to convey the same message. Alternatively, the display portions 20 and 22 may operate separate from one another to convey two different messages. The display portions 20 and 22 may operate independently to indicate a directional characteristic, for example the direction a road turns or a direction in which a corrective maneuver of the vehicle should be taken. While the display portions 20 and 22 are shown to be identical mirror opposites of each other, according to other exemplary embodiments the display portions 20 and 22 may have different from one another. While the display portions 20 and 22 are shown to have a specific configuration, according to other exemplary embodiments the display portions 20 and 22 may have different configurations.

Figure 4:
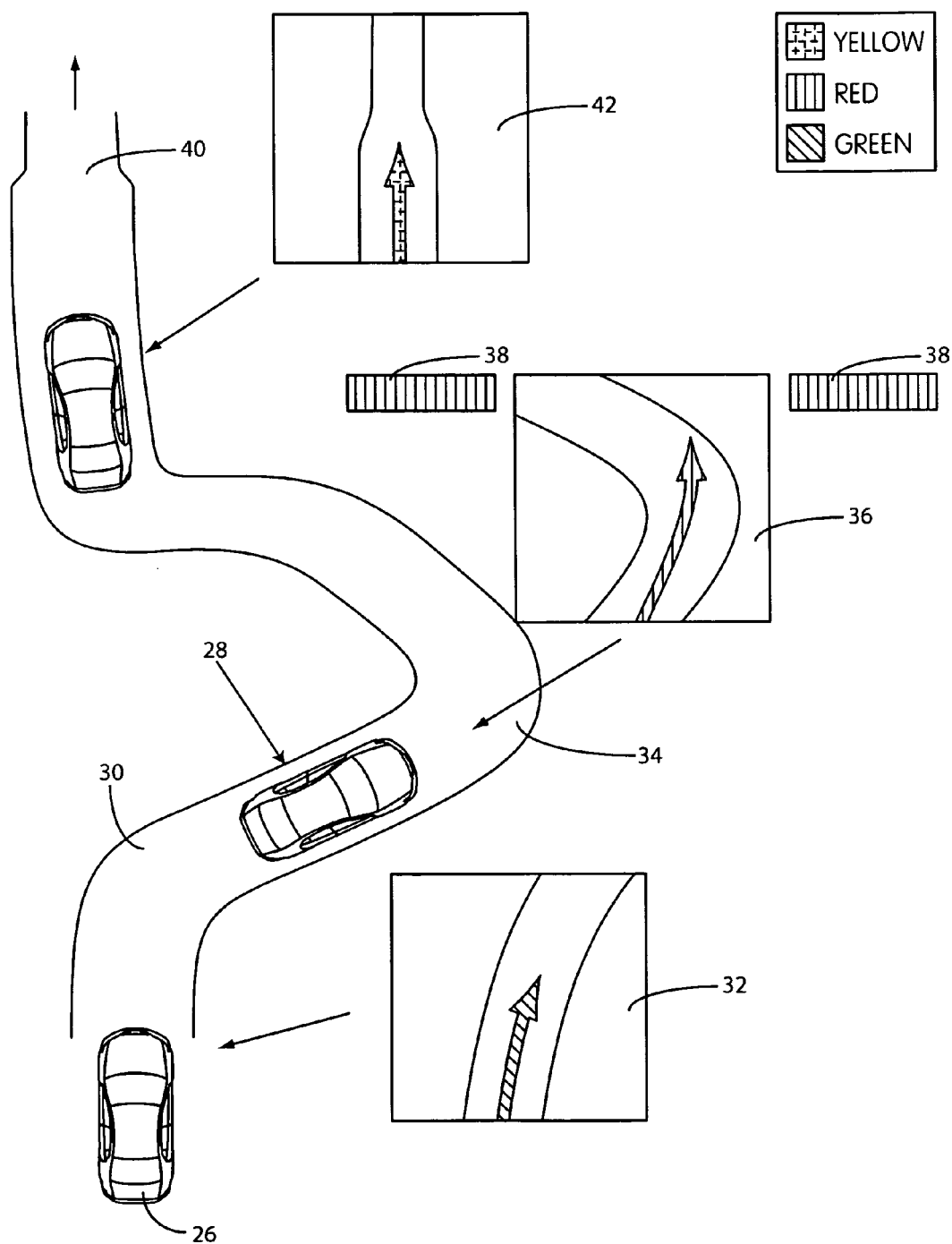
FIG. 4 is an overhead view of a vehicle and a display indicating a prediction of an effect of vehicle parameters on the vehicle with respect to geometric or navigability characteristics of the road, according to an exemplary embodiment.

Referring to FIG. 4, a vehicle 26 is traveling down a road 28, according to an exemplary embodiment. As the vehicle 26 approaches a first corner 30, the display provides a message 32 to the driver including a green arrow around the approaching corner to indicate that the current or predicted vehicle state (e.g., speed, acceleration, braking, and/or steering) may be adequate to safely traverse the vehicle 26 around the corner 30 with respect to the geometry, navigability, and/or conditions of the road 28 at the corner 30. If the current vehicle state is maintained or the predicted vehicle state is executed, the vehicle may should be able to traverse the corner 34.

As the vehicle 26 approaches a second corner 34, the display provides a message 36 to the driver including a red arrow around the approaching corner and illuminated display portions 38 to indicate that a current or predicted vehicle state (e.g., speed, acceleration, braking, and/or steering) may be excessive and/or insufficient to safely traverse the vehicle 26 around the corner 34 with respect to the geometry, navigability, and/or conditions of the road 28 at the corner 34. If the current vehicle state is maintained or the predicted vehicle state is executed, the vehicle may not be able to traverse the corner 34.

As the vehicle 26 approaches a narrow section 40, the display provides a message 42 to the driver including a yellow arrow through the narrow section 40 to indicate that the driver should exercise caution at a current or predicted vehicle state (e.g., speed, acceleration, braking, and/or steering) to safely traverse the vehicle 26 through the narrow section 40 with respect to the geometry, navigability, and/or conditions of the road 28 at the narrow section 40. If the current vehicle state is maintained or the predicted vehicle state is executed, the vehicle may be able to traverse the narrow section 40.

Figure 5:
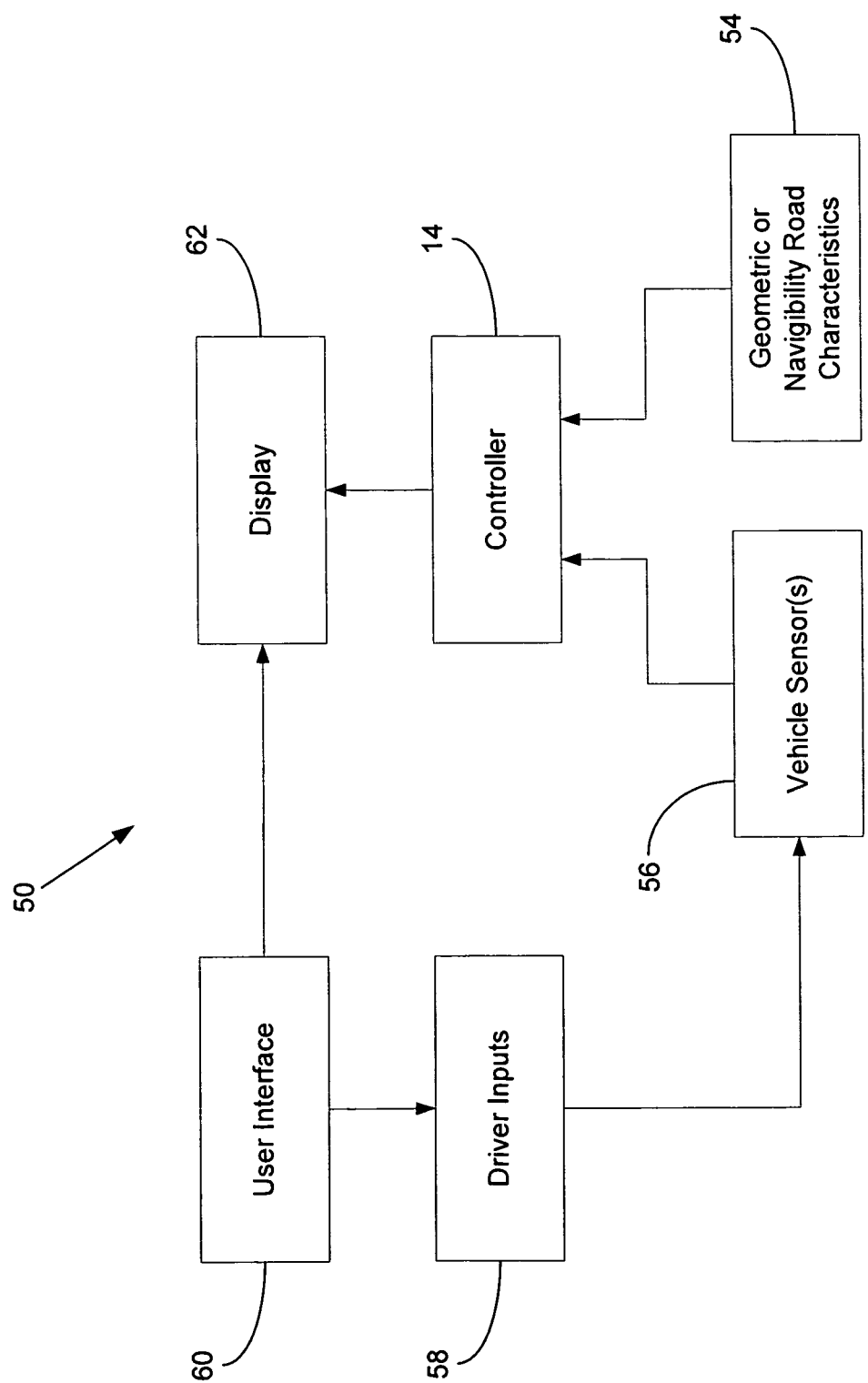
FIG. 5 is a block diagram of a system for predicting an effect of vehicle parameters on the vehicle with respect to geometric or navigability characteristics of the road, according to an exemplary embodiment.

Referring to FIG. 5, a vehicle system or steering wheel system 50 is configured to provide a message (e.g., a warning message) to a driver according to an exemplary embodiment. The system 50 includes the controller 14, geometric or navigability road characteristics 54, one or more vehicle sensors 56, driver inputs 58, a user interface 60, and a display 62.

The controller 14 is configured to receive the geometric or navigability characteristics 54 of the road and vehicle parameters from the vehicle sensors 56. According to various exemplary embodiments, the geometric or navigability characteristics 54 may include one or more of map data, GPS data, vehicle to vehicle data, vehicle to infrastructure data, radar data, vehicle vision system data, light detection and ranging data, a graphical representation of the road, a curve angle of the road, a degree of a curve bank, an environmental condition, a traffic condition, a road surface characteristic, a road width, or any other data that may relate to the geometry, navigability, or condition of the road. The geometric and navigability characteristics 54 may include data related to traffic jams, road surface transitions, narrowing/widening of the road, potholes, obstructions, environmental conditions (e.g., rain, snow, ice, darkness, etc.), a coefficient of friction, or any other data related to the road. The geometric or navigability characteristics 54 of the road may be received from one or more of a memory, a vehicle sensor or system, or any wireless communication source (e.g., via a cellular signal, a DSRC signal, an FM signal, a WiFi signal, a satellite signal, or any other wireless signal of past, present, or future design). The vehicle to infrastructure data may be received from a localized wireless node for dangerous curve speed warnings, a localized wireless node on intersections, or a localized wireless node with mobile construction equipment. Vehicles approaching the nodes can receive information about road constructions, dangerous surfaces, or any other conditional data that is related to geometric or navigability characteristics of the road.

According to various exemplary embodiments, the vehicle parameters may include one or more of steering, acceleration, speed, and braking. The vehicle parameters may be obtained, calculated, or estimated from conventional vehicle sensors, for example vehicle sensors mounted in the vehicle during production of the vehicle. The vehicle parameters from the vehicle sensors 56 are based on the driver inputs 58 to the user interface 60, for example a pressure to a brake and/or gas pedal, a direction and amount of steering, etc. The user interface 60 may also include controls to configure the display 62 based on driver preferences, for example to set a message warning scheme or to turn messages on or off.

The controller 14 generates a prediction of an effect of the vehicle parameters on the vehicle with respect to the geometric or navigability characteristics 54 of the road. The prediction may include data to warn the driver of excessive speed, excessive acceleration, excessive braking, insufficient braking, insufficient braking, understeer, or oversteer for an approaching geometry, navigability, or condition of the road. The prediction may also or instead include data indicating when and to what degree the driver should begin to initiate a turn, end a turn, apply a brake, release a brake, accelerate, decelerate, or perform a corrective action. The controller 14 sends a signal based on the prediction to the display 62.

The display 62 is configured to display a representation of the prediction based on the signal received from the controller 14. As described above, the display can warn the driver of excessive speed, excessive acceleration, excessive braking, insufficient braking, understeer, or oversteer for an approaching geometry of the road. The display can be configured to change size, color, shape, and/or intensity, for example based on the severity of the warning. The display 62 may also include a graphical representation of a vehicle course, bearing, and/or speed. The display 62 can include data indicating when and to what degree the driver should begin to initiate a turn, end a turn, apply a brake, release a brake, accelerate, decelerate, or perform a corrective action. According to various exemplary embodiments, the display 62 can be similar to the display 16 or can have any other configuration capable of providing a warning or instructive message to the driver.

Figure 6:
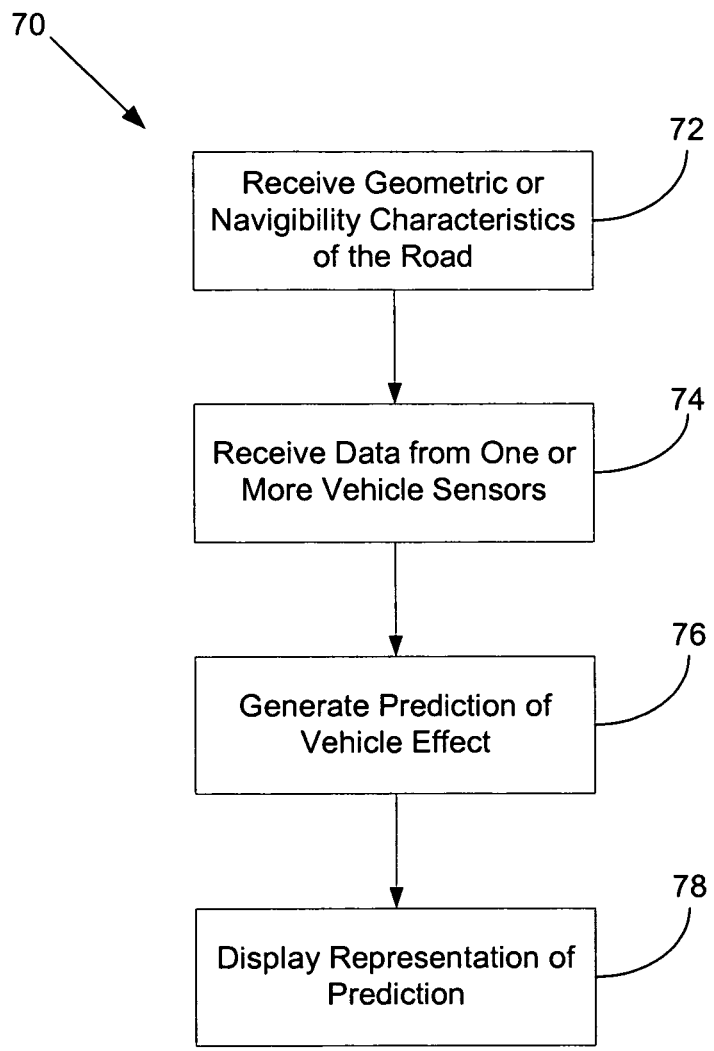
FIG. 6 is a process flow diagram of a method for predicting an effect of vehicle parameters on the vehicle with respect to geometric or navigability characteristics of the road, according to an exemplary embodiment.

Referring to FIG. 6, a method 70 is configured to provide a message (e.g., a warning message, an instructive message, etc.) to a driver according to an exemplary embodiment. The controller 14 receives the geometric or navigability characters 54 of the road (step 72) as well as data from the one or more vehicle sensors 56 (step 74). The controller 14 generates a prediction of an effect of the vehicle parameters on the vehicle with respect to the geometric or navigability characteristics 54 of the road, as described above (step 76). The display 62 receives a signal based on the prediction from the controller 14 and displays the message to the driver, for example a warning message or a message instructing the driver on actions to take (step 78).

It is noted that while the displays and display portions described above are located in a steering wheel, according to other exemplary embodiments, one or more of the displays or display portions may be located on or in an instrument panel, dashboard, or other location in the vehicle within the vision of a driver who is watching the road in front of him or her. It is also noted that in addition to or instead of a display, a message can be conveyed to the driver through audible warning or instruction cues, for example vocal instructions or warning tones. The message information may only guide the driver and never take control away from the driver.

According to some exemplary embodiments, the system 50 may be used to train a driver how to handle and control a car for racing purposes. For training on a new course, the display can be tailored to provide real-time driver feedback through size, shape, color, and intensity. For example, a dynamic icon could be used to indicate when a driver should begin to initiate a turn and when the turn should be ended. A color coding of the LED and/or icons can be used to indicate if the speed is too low or high for the location on the track.

According to other exemplary embodiments, the system 50 can be used for visual driver assistance for a parking assistance system. For example, the display 62 or another dynamic display provide parking guidance that the driver can follow to park the vehicle. Conventional automated systems park the vehicle fully autonomously, but do not allow the driver to manually follow the parking guidance. Additionally, the parking system may begin to park the vehicle autonomously, but allow the driver to override the automated parking at anytime. This manual functionality may allow the driver to gain confidence in the automated functions.

The present disclosure has been described with reference to exemplary embodiments, however workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter. It is also noted that the disclosed methods may be performed in any of a variety or sequence of steps and may include more or fewer steps than illustrated.

What is claimed is:

1. A steering wheel system for a vehicle, comprising:
a display; and
a controller configured to receive vehicle parameters from one or more vehicle sensors and receive geometric or navigability characteristics of the road, the controller generating a prediction of an effect of the vehicle parameters on the vehicle with respect to the geometric or navigability characteristics of the road, the controller configured to send a signal to the display based on the prediction,
wherein the display is configured to display a representation of the prediction based on the signal received from the controller.

2. The steering wheel system of claim 1, wherein the vehicle parameters comprise one or more of steering, acceleration, speed, and braking.

3. The steering wheel system of claim 1, wherein the geometric or navigability characteristics comprise one or more of map data, GPS data, vehicle to vehicle data, vehicle to infrastructure data, radar data, vehicle vision system data, light detection and ranging data, parking assistance data, a graphical representation of the road, a curve angle of the road, a degree of a curve bank, an environmental condition, a traffic condition, a road surface characteristic, and a road width.

4. The steering wheel system of claim 1, wherein the display comprises an indicator configured to change size, color, shape, and/or intensity.

5. The steering wheel system of claim 4, wherein the indicator is configured to warn the driver of excessive speed, excessive acceleration, excessive braking, insufficient braking, understeer, or oversteer for an approaching geometry of the road.

6. The steering wheel system of claim 5, wherein the indicator increases in intensity as a severity of the speed, excessive acceleration, excessive braking, insufficient braking, understeer, or oversteer increases.

7. The steering wheel system of claim 6, wherein the indicator is red when the vehicle parameters are not appropriate for the geometric or navigability characteristics of the road, the indicator is yellow when the driver actions may not be appropriate for the geometric or navigability characteristics of the road, and/or the indicator is green when the driver actions are appropriate for the geometric or navigability characteristics of the road.

8. The steering wheel system of claim 1, wherein the display comprises an icon indicating when and to what degree the driver should begin to initiate a turn, end a turn, apply a brake, release a brake, accelerate, and/or decelerate.

9. The steering wheel system of claim 1, wherein the display provides a graphical representation of the vehicle parameters and/or geometric or navigability characteristics of the road, the graphical representation indicating an existence and severity of excessive speed, excessive acceleration, excessive braking, insufficient braking, understeering, or oversteering.

10. The steering wheel system of claim 9, wherein the display comprises a graphical representation of a vehicle course, bearing, and/or speed.

11. The steering wheel system of claim 1, wherein the geometric or navigability characteristics of the road are received from one or more of a memory, a vehicle sensor or system, or a wireless communication signal.

12. The steering wheel system of claim 1, wherein the display comprises one or more of an inorganic LED, an organic LED, an LCD display, a TFT display, an incandescent bulb, a plasma display, and a CRT display.

13. The steering wheel system of claim 1, wherein the display can be selectively enabled or disabled by the driver.

14. The steering wheel system of claim 1, further comprising an audio device configured to provide an audible indication of the prediction.

15. A vehicle system, comprising:
a steering wheel usable by a driver for steering a vehicle;

a display;

a controller configured to receive vehicle parameters from one or more vehicle sensors and receive geometric or navigability characteristics of the road, the controller generating a prediction of an effect of the vehicle parameters on the vehicle with respect to the geometric or navigability characteristics of the road, the controller configured to send a signal to the display based on the prediction, wherein the display is configured to display a representation of the prediction based on the signal received from the controller.

16. The steering wheel system of claim 15, wherein the vehicle parameters comprise one or more of steering, acceleration, speed, and braking.

17. The steering wheel system of claim 15, wherein the geometric or navigability characteristics comprise one or more of map data, GPS data, vehicle to vehicle data, vehicle to infrastructure data, radar data, vehicle vision system data, light detection and ranging data, parking assistance data, a graphical representation of the road, a curve angle of the road, a degree of a curve bank, an environmental condition, a traffic condition, a road surface characteristic, a road width.

18. The vehicle system of claim 15, wherein the display is configured to warn the driver of excessive speed, excessive acceleration, excessive braking, insufficient braking, understeering, or oversteering for the approaching geometry of the road.

19. The vehicle system of claim 15, wherein the display indicates when and to what degree the driver should begin to initiate a turn, end a turn, apply a brake, release a brake, accelerate, and/or decelerate.

20. A method for providing driver guidance, comprising:
receiving geometric or navigability characteristics of a road;
receiving data from one or more vehicle sensors;
generating a prediction of an effect of the vehicle parameters on the vehicle with respect to the geometric or navigability characteristics of the road; and
displaying a message for the driver based on the prediction.

21. The vehicle system of claim 20, wherein the display is configured to warn the driver of excessive speed, excessive acceleration, excessive braking, insufficient braking, understeering, or oversteering for the approaching geometry of the road.

22. The vehicle system of claim 20, wherein the display indicates when and to what degree the driver should begin to initiate a turn, end a turn, apply a brake, release a brake, accelerate, and/or decelerate.

* * * * *